(12) United States Patent
Kominsky

(10) Patent No.: US 8,553,237 B2
(45) Date of Patent: Oct. 8, 2013

(54) OPTICAL BLADE CLEARANCE PROBE

(75) Inventor: Daniel Kominsky, Christiansburg, VA (US)

(73) Assignee: Prime Photonics, LC, Blacksburg, VA (US)

( * ) Notice: Subject to any disclaimer, the term of this patent is extended or adjusted under 35 U.S.C. 154(b) by 39 days.

(21) Appl. No.: 13/347,299

(22) Filed: Jan. 10, 2012

(65) Prior Publication Data

US 2012/0182563 A1 Jul. 19, 2012

Related U.S. Application Data

(60) Provisional application No. 61/461,180, filed on Jan. 14, 2011, provisional application No. 61/520,953, filed on Jun. 18, 2011, provisional application No. 61/520,948, filed on Jun. 18, 2011.

(51) Int. Cl.
*G01B 11/14* (2006.01)

(52) U.S. Cl.
USPC ....................................... 356/625

(58) Field of Classification Search
USPC ....................................... 356/625
See application file for complete search history.

(56) References Cited

U.S. PATENT DOCUMENTS

| | | | |
|---|---|---|---|
| 2,960,908 A | 11/1960 | Willits et al. | |
| 4,946,275 A | 8/1990 | Bartholomew | |
| 4,978,850 A | 12/1990 | Nakamura et al. | |
| 8,189,176 B2 * | 5/2012 | Moir | 356/28.5 |
| 2010/0168981 A1 | 7/2010 | Kominsky | |

FOREIGN PATENT DOCUMENTS

| | | |
|---|---|---|
| DE | 2730508 A1 | 1/1979 |
| EP | 0492381 A2 | 7/1992 |

OTHER PUBLICATIONS

English translation of DE 27 30 508 A1.*
International Search Report and Written Opinion issued in connection with the corresponding International Application No. PCT/US2012/021295 on Apr. 17, 2012.
Translated Abstract of EP 0492381.

* cited by examiner

*Primary Examiner* — Tu Nguyen
(74) *Attorney, Agent, or Firm* — The H.T. Than Law Group

(57) ABSTRACT

The sensor comprises a beam of electromagnetic radiation projecting across a gap between the stationary member and the translating member, a reference detector having a reference FOV and a signal detector having a signal FOV. The sensor is to be mounted on the stationary member. The electromagnetic radiation beam, the reference FOV and the signal FOV intersect in a volume including the gap, and the gap is calculated from the reflected electromagnetic radiation received by the reference and signal detectors. The gap can be determined from a ratio between a rise time in the signal pulse and a rise time in the reference pulse, or a ratio between a fall time in the signal pulse and a fall time in the reference pulse, or a ratio between a delay time in the signal pulse and a delay time in the reference pulse, among other features.

22 Claims, 10 Drawing Sheets

OPTICAL BLADE CLEARANCE PROBE

CROSS-REFERENCE TO RELATED APPLICATIONS

The present application claims priority under 35 U.S.C. §119(e) to U.S. provisional patent application Ser. No. 61/461,180 entitled "Single Lens Variation of the FOCIS Probe" filed on Jan. 14, 2011, U.S. provisional application Ser. No. 61/520,953 entitled "FOCIS Based Blade Identification" filed no Jun. 18, 2011, and U.S. provisional application Ser. No. 61/520,948 entitled "FOCIS™ Based FOD Detection" field on Jun. 18, 2011, which are incorporated by reference herein in their entireties.

STATEMENT REGARDING FEDERALLY SPONSORED RESEARCH OR DEVELOPMENT

This invention was made with government support under U.S. Army contract no. W911W6-08-C-0058 awarded by the Department of the Army. The Government of the United States of America may have certain rights to this invention.

FIELD OF THE INVENTION

This invention generally relates to an improved optical probe that measures the distance between a translating member and a stationary member, such as the distance between the shroud of a jet engine and the edge of a rotating blade, and a method for measuring such distance.

BACKGROUND OF THE INVENTION

Measurement of blade clearance in all stages of a gas turbine engine, jet engine or any other turbo-machines and turbines is an important step towards reducing maintenance and improving the thermodynamic efficiency and thrust output of the engine. Any gas which travels between the blade tips and the engine shroud represents a significant loss of energy from the system, lowering thrust and requiring the consumption of additional fuel. Thus, it is desirable for these reasons to minimize the clearance of the blades. Doing so, however, runs the risk of a catastrophic failure occurring if the blades impact the engine shroud. It is desirable, therefore, to know how much clearance is present and to utilize that data to maintain a minimal, yet safe, clearance. Once this information is available, it can be applied as the driver for a suite of active control technologies, such as vibration cancellation, adaptive modification of the housing diameter, or emergency shutdown to prevent catastrophic failure.

The patent literature discloses several attempts to measure rotor tip clearance in turbo-machineries. U.S. Pat. No. 4,049,349 to A. J. Wennerstrom discloses a measuring device comprising a pair of optical sensors aimed at the rotating blades, and a single sensor aimed at the rotating shaft. Each sensor comprises a light emitter and a light detector. The pair of optical sensors aiming at the rotating blades is spaced a short distance apart, and their light emitters project light beams at an angle to one another. A digital clock comprising a signal generator producing a stable frequency is used as a timing device for the system. The light beams aimed at the rotating blades are reflected and scattered by passing blades. As a rotating blade intercepts the first light beam, its reflected light starts a counter associated with the digital clock. As this rotating blade intercepts the second light beam from the pair, its reflected light stops the counter. The sensor aiming at the rotating shaft starts and stops another counter recording the number of cycles or pulses from the digital clock, which occurred during one revolution of the shaft. By dividing the number of counts measured by the pair of sensors aiming at the rotating blades by the number of counts during one revolution, the rotor tip clearance is ascertained.

U.S. Pat. No. 4,326,804 to P. W. Mossey discloses another tip clearance measuring device that comprises a single light emitter and a single light receiver. The emitted light impinges the rotating blades at an angle. The reflected light is focused on to a position detector. The tip of the rotating blade reflects light at varying angles as a function of the tip clearance. The angles of the reflected light are detected by the position detector, and the tip clearance is derived from said angles.

U.S. Pat. No. 5,017,796 to H. Makita also discloses a tip clearance measuring device with a single light emitter and a single light receiver. This device has a holding spring that biases a movable focusing lens to focus the emitted light on to the moving blade. The movable lens is adjusted by oscillating movement until the reflected light has a maximum value. The tip clearance is related to the position of the movable lens at the maximum value of the reflected light.

U.S. Pat. No. 4,357,104 to I. Davinson passes light through an astigmatic lens which changes the shape of the beam to measure the tip clearance. U.S. Pat. No. 4,596,460 to I. Davinson uses an optical triangulation technique using a T-shaped optical path to measure tip clearance. U.S. Pat. No. 4,180,329 to J. R. Hildebrand discloses a single blade proximity probe using two light beams having different frequencies. The two light beams are mixed prior to being projected towards the blades, and the reflected signal is subtracted by the frequency of the second light beam.

Commonly-owned U.S. published patent applications US-2010-0177299 A1 and US-2010-0168981 A1 by the present inventor disclose an apparatus and a method for ascertaining a gap between a stationary member and a rotating member. At least a reference light beam and a signal light beam, which have different focal lengths or which diverge/converge at different rates, are fixed to the stationary member and proximate to each other. The beams are projected across a gap between the stationary member and the rotating member toward the rotating member. The reference and signal beams are reflected by the translating member when it intersects the reference and signal beam, and the reflected reference and signal pulses are obtained. The diameters of the reference beam and the signal beams have different diameters at the line of intersection. One or more features of the reflected reference pulse and the reflected signal pulse, such as a rise time of the pulses, a fall time of the pulses, a width of the pulses and a delay between the reflected reference pulse and the reflected signal pulse, among other factors, are obtained. The width of the gap is obtained using at least one of these factors. References US-2010-0177299 A1 and US-2010-0168981 A1 are incorporated herein by reference in their entireties.

SUMMARY OF THE INVENTION

Hence, the invention is generally directed to a method and a device to measure the gap or distance between the edge of a translating member, e.g., a rotating blade member in a jet engine, and a stationary second member, e.g., an engine shroud, using a single source of electromagnetic radiation.

The present invention includes a single or at least one electromagnetic radiation launch source or more preferably a visible light launch source and at least two electromagnetic radiation or visible light detectors, wherein the path of the launch source and the fields of view (FOV) of the detectors overlap or intersect in an area that covers the gap or distance between the edge of the translating member and the stationary member.

The present invention provides a sensor comprising a source of electromagnetic radiation to be mounted on a stationary member to project an electromagnetic radiation beam across a gap toward at least one translating or rotating member, a reference detector having a reference field of view (FOV) and a signal detector having a signal FOV to be mounted on the stationary member. The electromagnetic radiation beam, the reference FOV and the signal FOV intersect in a volume including this gap, and a feature of the translating member is measured from the reflected electromagnetic radiation received by the reference detector and by the signal detector.

This feature can be a measurement of the gap between the translating member and the stationary member, an identification of the translating member or a defect or damage to the translating member. This feature can also be a time period for the translating member to pass through this volume, the time at which the translating member arrived at the volume, or a profile of the intensity of the electromagnetic radiation generated or reflected when the translating member passes through this volume. A lens or other optical elements is preferably used to direct the electromagnetic radiation beam, the reference FOV and the signal FOV toward each other.

The stationary member may comprise a window that is transparent to the electromagnetic radiation and a spacer is preferably disposed between the lens and the window. The source of electromagnetic radiation, the reference detector and the signal detector each comprises an optical fiber or waveguide. The optical fibers or waveguides may comprise angled ends.

The present invention also provides a method for measuring a gap between a stationary member and at least one translating member comprising the steps of:
  i. projecting a beam of electromagnetic radiation across said gap;
  ii. providing a reference field of view (FOV) and a signal FOV across said gap;
wherein the beam of electromagnetic radiation, the reference FOV and the signal FOV intersect in an area that includes said gap;
  iii. receiving reflected electromagnetic radiation through the reference FOV and the signal FOV as the translating member moves through the beam of electromagnetic radiation;
  iv. calculating said gap from at least one ratio between a signal pulse received from the signal FOV and a reference pulse received from the reference FOV.

Step (iv) comprises a step of determining a ratio between a rise time in the signal pulse and a rise time in the reference pulse, or comprises a step of determining a ratio between a fall time in the signal pulse and a fall time in the reference pulse, or comprises a step of determining a ratio between a delay time in the signal pulse and a delay time in the reference pulse, or comprises a step of determining a ratio between signal rise time and rise time delay. This method may further comprise the step of minimizing a reflection of said electromagnetic radiation from said optical element back to the reference detector and the signal detector, and the step of varying the optical power of the lens 20 by varying the distance from the ends of the fibers to the lens.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

This invention generally relates to an improved optical probe that measures a feature of a translating member and more specifically measures the gap or distance "L" between the translating member and a stationary member, such as the distance between the shroud of a jet engine and the edge of a rotating blade, and a method for measuring such distance. Unique to the present invention is that a single source of electromagnetic radiation and more preferably visible light launch source is capable of measuring this gap or distance. While multiple launch sources can be used, using a single launch source minimizes the size of the probe. The probe further comprises at least two detectors, which are referred hereinafter as a reference detector and a signal detector. It is noted that the terms "reference" and "signal" are used for convenience and attach no particular property(ies) to the individual detectors. Also by using one launch source, the present invention also minimizes the possibility of different detectors reporting different values based on the motion of the translating member.

Figure 1:
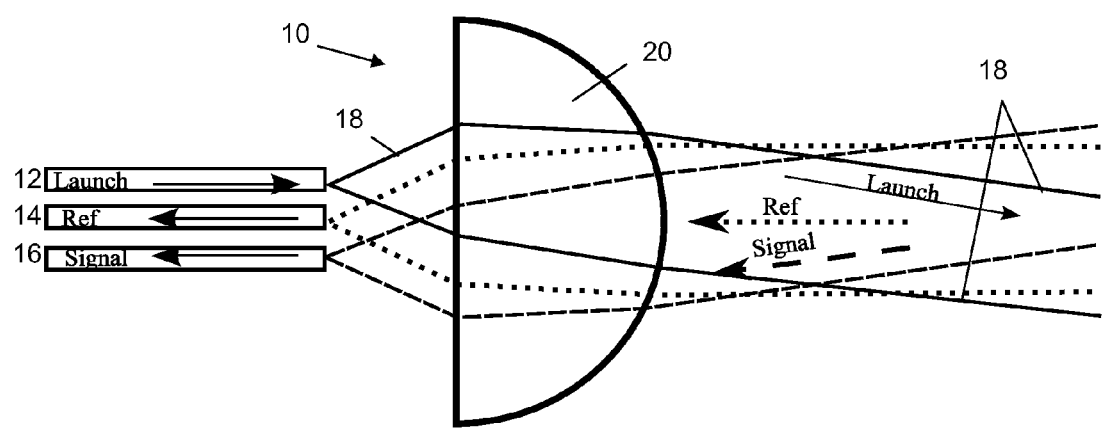
FIG. 1 is a schematic view of an embodiment of the optical probe in accordance with the present invention.
Figure 2:
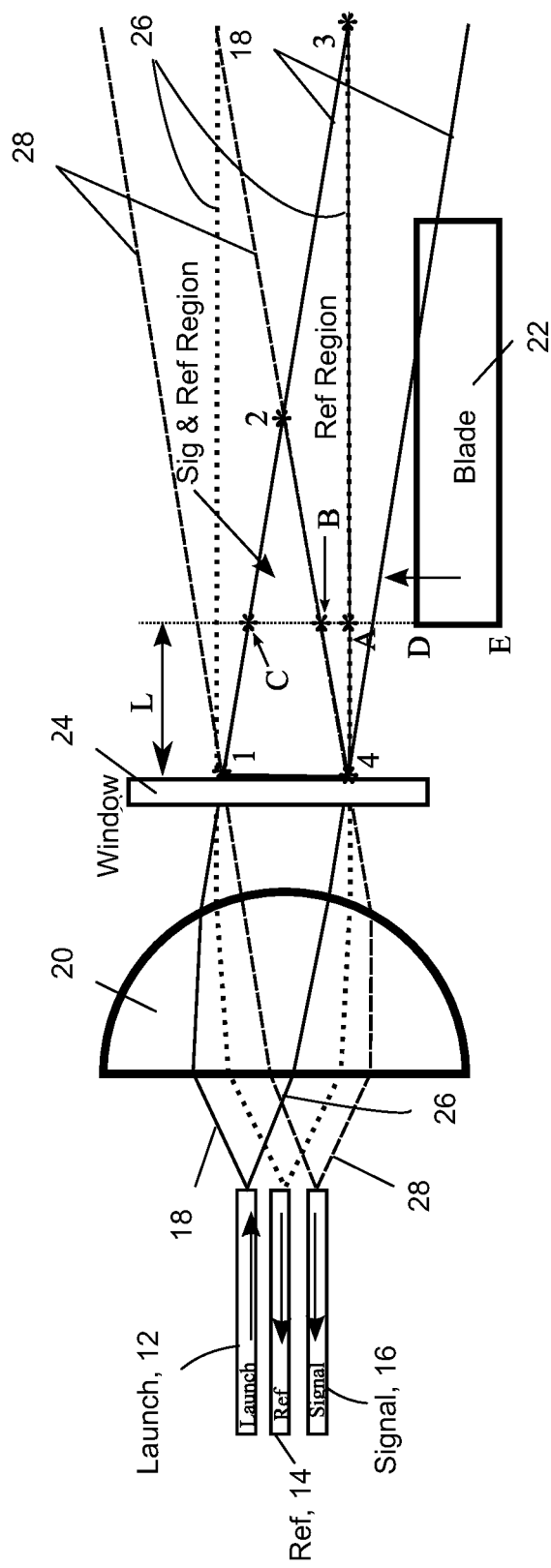
FIG. 2 is another schematic view of the optical probe of FIG. 1 showing with a stationary member and a rotating member and the geometric pattern formed by the launch beam and the fields of view of the reference and signal detector.

Referring to FIGS. 1 and 2, an exemplary sensor 10 comprises light source 12, first detector or reference detector 14 and second detector or signal detector 16. Sensor 10 may operate with a local light source and local detectors or with the light source and detectors located remotely and have the launch light and reflected light transmitted through optical fibers. The present invention is not limited to any particular method of transmitting or receiving lights. Light source 12 and detectors 14 and 16 are preferably optical fibers or optical waveguides. Light source 12 projects an electromagnetic beam, preferably a visible light beam 18 toward lens 20. Beam 18 may also be in the non-visible range, such as ultraviolet, infrared or radio waves. Due to the curvature of lens 20 and more specifically the location on lens 20 where light beam 18 intersects, launch light beam 18 is bent at a predetermined angle into an enclosure or housing of translating member 22 or rotating blade 22. Probe 10 preferably comprises a window 24 that is transparent to the electromagnetic radiation used and window would be positioned adjacent to the housing of rotating blade(s) 22. In other words, window 24 may be transparent when the electromagnetic radiation is in the visible range, but may be opaque or translucent when the electromagnetic radiation is in the invisible range, such as ultraviolet or infrared. Gap "L" as discussed above is the distance from the housing or window 24 to the tip of blade 22.

Figure 4:
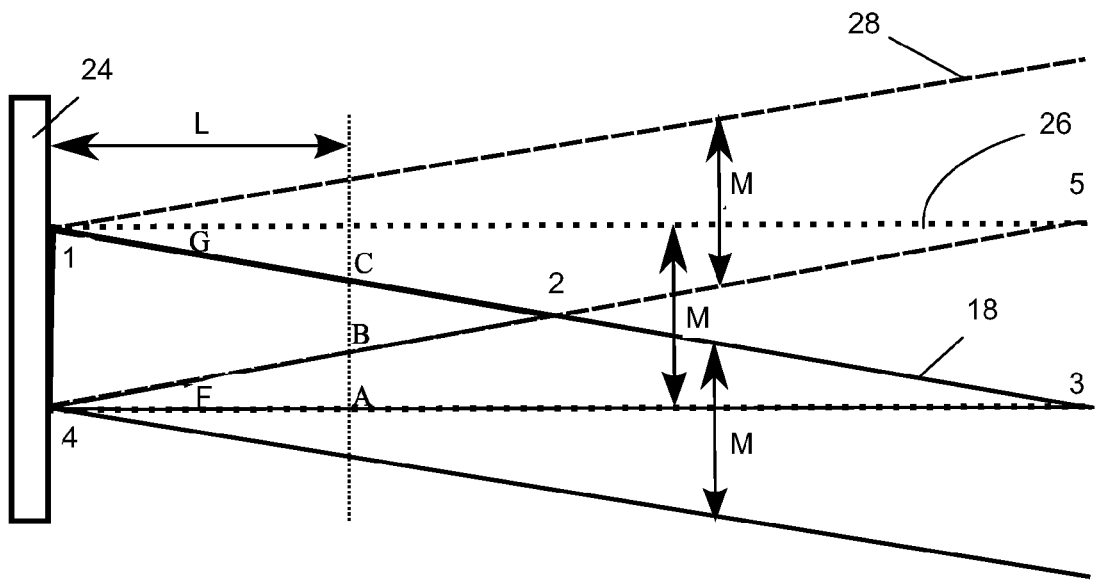
FIG. 4 is a partial enlarged view of FIG. 2 showing the geometric pattern.

Reference detector 14 and signal detector 16 in the present invention are preferably optical fibers or optical waveguides that receive electromagnetic radiations or lights that are reflected from rotating blade 22 as it enters light beam 18. Each detector 14, 16 has a field of view (FOV), and when light is reflected within its FOV the reflected light can be detected by that detector. It is noted that, blade 22 only reflects light when it enters and remains within light beam 18, which is bordered with solid lines in FIG. 1. The FOVs or fields of view of reference detector 14 and signal detector 16 are the areas where light or electromagnetic radiation can be detected by the detectors, similar to the FOV of a camera or a binocular. Launch light beam 18, reference FOV 26 and signal FOV 28 intersect lens 20 at different section of its curvature and are bent at different angles. Preferably, light beam 18, reference FOV 26 and signal FOV 28 intersect within the enclosure of rotating blades 22 and preferably within an area or volume encompassing gap "L", as shown in FIGS. 1, 2 and 4, and discussed below. In other words, light beam 18, reference FOV 26 and signal FOV 28 pass through a common volume.

When front edge D of blade 22 reaches point A inside light beam 18 and within FOV 26 of reference detector 14, blade 22 begins to reflect light from light beam 18 and continues to reflect light until back edge E of blade reaches point C and exits light beam 18. In this example, point C is within reference FOV 26. The reflected reference signal travels back through window 24 and to the curved surface of lens 20 and is bent and directed to reference detector 14.

When front edge D of blade 22 reaches point B within light beam 18, the reflected light is within FOV 28 of signal detector 16 and remains within reference FOV 26. Until back edge E exits light beam 18 at point C, the reflected light is within both FOVs 24 and 26 and the reflected light is received by both detectors 14 and 16. After point C, while blade 22 technically remains within FOVs 26 and 28 for a short time (see triangle 1-2-5 in FIG. 4) and then within signal FOV 28 for another short time, as shown more particularly in FIG. 2, blade 22 is outside of light beam 18 and reflects no light.

Another way of explaining the FOVs and reflected light is also illustrated in FIG. 2. Within light beam 18, reference FOV 26 intersects with light beam 18 and form large triangle 1-3-4. Light reflected from blade 22 as it moves through triangle 1-3-4 would be detected by—reference detector 14. Within light beam 18, reference FOV 26 and signal FOV 28 intersect with light beam 18 to form small triangle 1-2-4. Light reflected within triangle 1-2-4 is detected by both reference detector 14 and signal detector 16. Preferably base segment 1-4 of triangle 1-2-4 and 1-3-4 coincides with the surface of window 24 closest to blade(s) 22.

Figure 3:
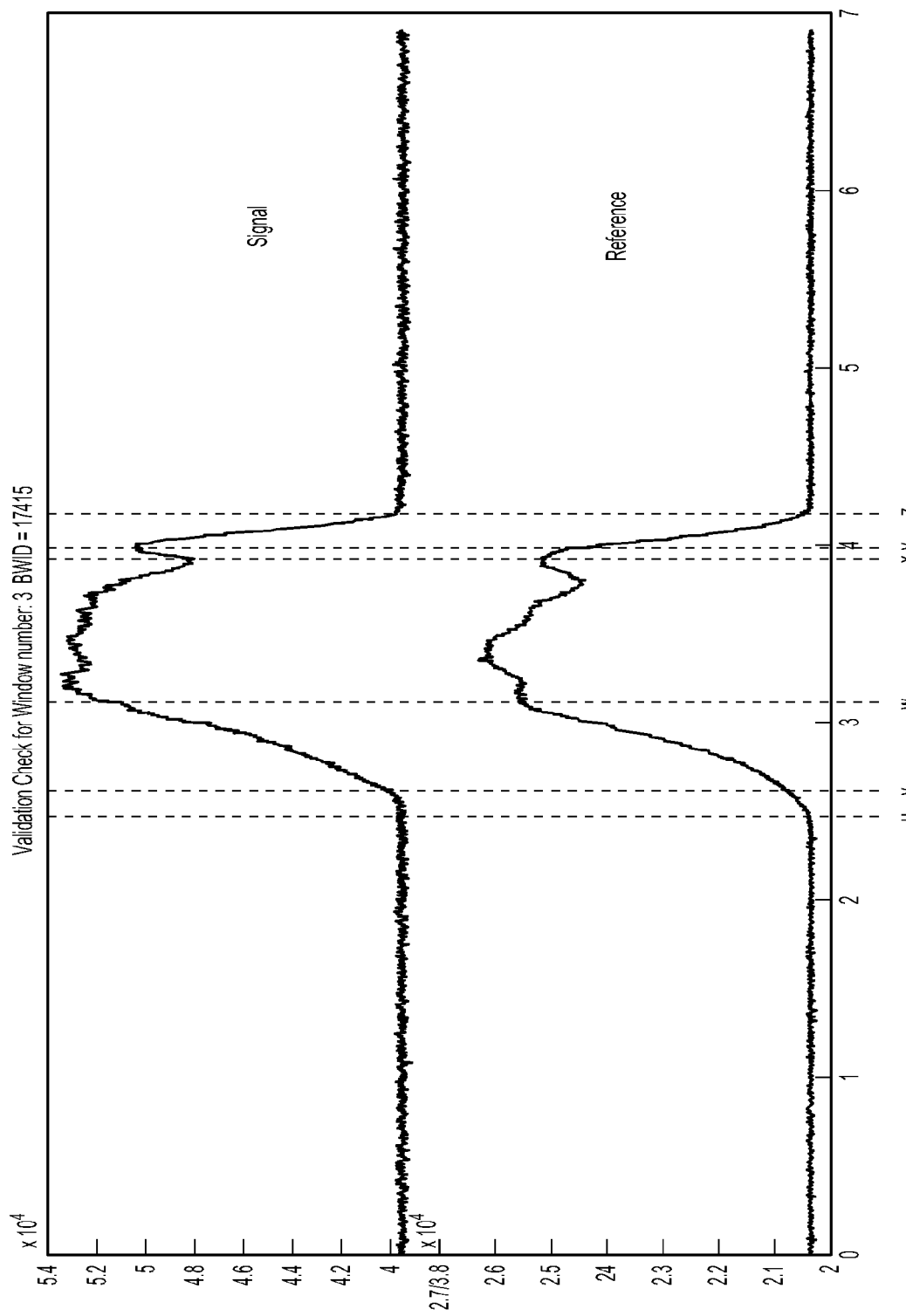
FIG. 3 illustrates the pulses created by the light reflected by the rotating member and detected by the signal detector and the reference detector.

Exemplary reflected lights received by reference detector 14 and signal detector 16 from blade 22 are illustrated in FIG. 3. FIG. 3 illustrates profiles of the intensity of the electromagnetic radiation generated by the passage of blade 22 through the intersection of the signal FOV, the reference FOV and light source 12. FIG. 3 also shows the time period that it takes for blade 22 to pass through this intersection. The reflected lights/electromagnetic radiations are features of blade 22 or the translating/rotating member. When front edge D of blade 22 arrives at point A, it begins to reflect light into reference FOV 26 initiating a rising edge of a pulse on the reference channel at time marker "u". As expected, at time marker "u" there is no reflected light at the signal channel. As front edge D arrives at point B, it begins to reflect light into the signal FOV 28 initiating a rising edge of a pulse on the signal channel at time marker "v". At time marker "v" reflected light continues to be received in the reference channel. When front edge D arrives at point C, the far edge of light beam 18, blade 22 begins to leave light beam 18 at time marker "w" and the peak reflection of light reaches both reference FOV 26 and signal FOV 28. When edge D arrives at C (w) the entire beam of light is on the end of the blade. During this time (w-x) front edge D has passed C, but the trailing edge E has not yet reached A.

When back edge E of blade 22 arrives at point A, the reflected light into reference FOV 26 begins to decline at time marker "x". As expected at time marker "x", the reflected light in signal FOV has not declined. When back edge E reaches point B, the reflected light into signal FOV 28 begins to decline at time marker "y". When the back edge E reaches point C, the far edge of light beam 18 at time marker "z", blade 22 exits light beam 18 and no longer reflects light.

Gap L can be measured by ratios of timing features illustrated in FIG. 3. In one embodiment, the ratio of rise times, i.e., the amount of time for the blade to fully enter signal FOV 28 divided by the time for the blade to fully enter the reference FOV 26, is proportional to gap L. The ratio of the width of the pulses shown in FIG. 3 and other time ratios are also proportional to gap L.

The distances AB, AC and BC can be determined with the following equations. As shown in FIG. 4, F is the angle made by reference FOV 26 and signal FOV 28 and G is the angle made by reference FOV 26 and light beam 18. M is the thickness of light beam 18 and of the FOV 26 and 28.

$$AB = L \cdot \tan(F),$$

$$AC = M - L \cdot \tan(G)$$

$$BC = AC - AB$$

$$BC = M - L \cdot \tan(F) - L \cdot \tan(G)$$

$$BC = M - L \cdot (\tan(F) + L \cdot \tan(G))$$

It is noted that for any specific probe the tangent of angle F, the tangent of angle G and their sum are constant values.

For a point on an object, e.g., front edge D and back edge E of blade 22, traveling at a constant velocity (v), the time required to travel any distance (d) is the distance divided by the velocity: (t=d/v). Referring to the time markers shown in FIG. 3, the following relationship can be established.

| Property | Time Marker | Path | Distance traveled | Time |
| --- | --- | --- | --- | --- |
| Signal Rise Time | vw | BC | M − L · (tanF + tanG) | (M − L · (tanF + tanG))/v |

| Property | Time Marker | Path | Distance traveled | Time |
|---|---|---|---|---|
| Reference Rise Time | uw | AC | $M - L \cdot \tan G$ | $(M - L \cdot \tan G)/v$ |
| Rise Time Delay | uv | AB | $L \cdot \tan F$ | $(L \cdot \tan F)/v$ |
| Signal Fall Time | yz | BC | $M - L \cdot (\tan F + \tan G)$ | $(M - L \cdot (\tan F + \tan G))/v$ |
| Reference Fall Time | xz | AC | $M - L \cdot \tan G$ | $(M - L \cdot \tan G)/v$ |
| Fall Time Delay | xy | AB | $L \cdot \tan F$ | $(L \cdot \tan F)/v$ |
| Signal Low Pulse Width | vz | BC + DE | $M - L \cdot (\tan F + \tan G) + DE$ | $(M - L \cdot (\tan F + \tan G) + DE)/v$ |
| Reference Low Pulse Width | uz | AC + DE | $M - L \cdot \tan G + DE$ | $(M - L \cdot \tan G + DE)/v$ |

The rise times can be used to calculate gap L, as follows. The ratio of signal rise time to reference rise time is:

$$\text{Rise time ratio} = \frac{vw}{uw}$$

$$= \frac{(M - L \cdot (\tan F + \tan G))/v}{(M - L \cdot \tan G)/v}$$

$$= \frac{M - L \cdot (\tan F + \tan G)}{(M - L \cdot \tan G)}$$

Rearranging these equations provide:

$$(M - L \cdot \tan G) \cdot \frac{vw}{uw} = (M - L \cdot (\tan F + \tan G))$$

$$M \cdot \left(\left(\frac{vw}{uw}\right) - 1\right) = L \cdot (\tan G - (\tan F + \tan G))$$

$$L = \frac{M \cdot \left(\left(\frac{vw}{uw}\right) - 1\right)}{(\tan G - (\tan F + \tan G))}$$

Since M, tangent of angle G and tangent of angle F are constant for a particular probe, the above equation for L, which is the gap between the stationary member presented by the outside surface of window 24 and the rotating member represented by blade 22, can be expressed as a ratio of time rise time between markers "v"-"w" and "u"-"w". In other words, $$L = \text{constant1} \cdot (vw/uw)$$

In other embodiments of the present invention, gap L can be calculated using the ratio of the fall times or the ratio of the delay times by applying similar methodology shown above. Gap L can also be expressed as:

$$L = \text{constant2} \cdot (yz/xz)$$

$$L = \text{constant3} \cdot (uv/xy)$$

The constant1, constant2 and constant3 in these equations may or may not be the same.

In yet other embodiments of the present invention, gap L can be calculated from dissimilar time markers, so long as the timing features correspond to different paths are selected, an equivalent set of calculations can be performed. For example, a ratio between signal rise time (path BC) to the fall time delay (path AB). Additionally, when the thickness of blade 22 (distance DE) is included, another set of calculations can be performed on the pulse width.

Virtually any combination of measurements can be combined to achieve the similar effect. For example, in the case of signal rise time to rise time delay:

Signal rise time/Rise time delay=$vw/uv$= $((M-L*(\tan F+\tan G))/v)/(L*\tan F/v)$ Rearranging this equation gives:

$L=(M*uv/vw)/(2*\tan F+\tan G)$ $L=\text{constant4}*(uv/vw)$

Similarly for pulse widths (at the bottom of the pulses):

(Signal low pulse width/Reference low pulse width)= $(vz/uz)vz/uz$ $vz/uz=((M-L\cdot(\tan F+\tan G)+DE)/v)/((M-L\cdot(\tan G)+DE)/v)$ Rearranging: $L=(DE-M)*(vz/uz-1)/(\tan F+\tan G*(1-vz/uz))$ Again, DE, M, tan F, and tan G are constants, so the equation simplifies to:

$L=\text{constant5}*(vz/uz-1)/(\text{constant6}+\text{constant7}(1-vz/uz))$

The constant1, constant2 constant3, constant4, constant5, constant6, and constant7 in these equations may or may not be the same.

Advantages of the present invention include, but are not limited to, a reduction in complexity of the probe, i.e., the probe is made from fewer parts compared to the probes taught in the prior art. The probe can be made smaller, since only one lens 20 can be used for three optical fibers (12, 14 and 16). Possible errors caused by changes in the rotational blades' position, movement and reflectivity which could occur in the time required to travel between a reference light beam and a separate signal light beam as taught in commonly owned patent applications US-2010-0177299 A1 and US-2010-0168981 A1 are minimized.

It is noted that the optical fibers that make up light source 12, reference detector 14, and signal detector 16, shown in FIGS. 1 and 2 can be positioned in different orders, e.g., light source 12 can be positioned on the bottom of the other two fibers. Light source 12 can be positioned between the other to fibers so long as light beam 18 is biased or angled toward on of the two detector fibers. In other words, triangles 1-2-4 and 1-3-4 have different sizes.

Figure 2A:
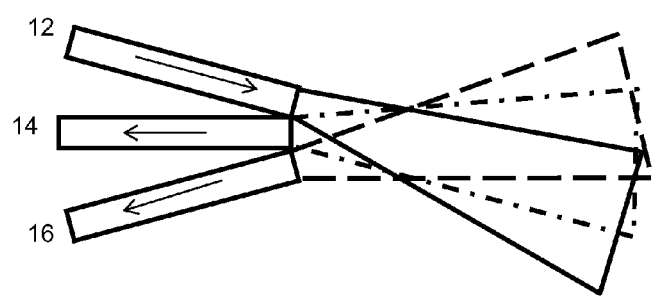
FIGS. 2A-2C show other embodiments of the inventive optical probe.
Figures 2B, 2C:
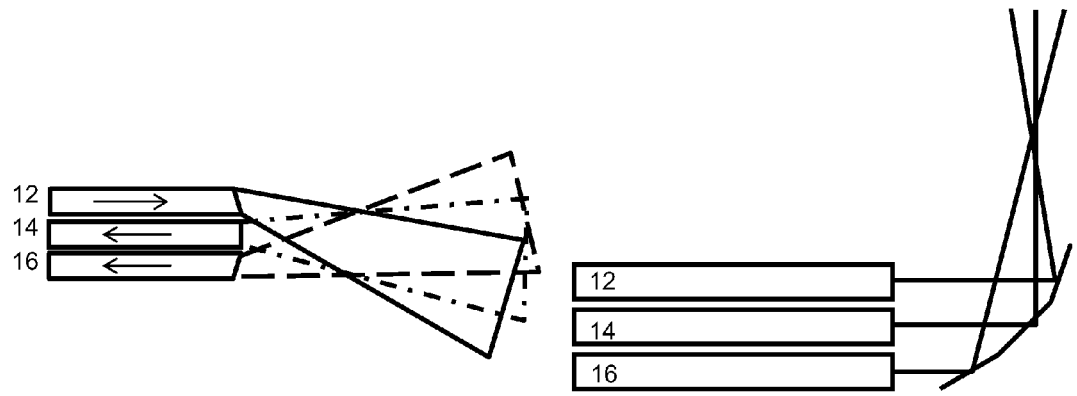

In another embodiment, lens 20 can be replaced by positioning the ends of optical fibers 12, 14 and 16 at angles (similar to angles G and F discussed above) so that light beam 18 and FOVs 24 and 26 converge, as illustrated in FIG. 2a. Alternatively, the optical fibers 12, 14 and 16 can be positioned in paralled as shown in FIGS. 1 and 2, but the ends are polished at angles (similar to angles G and F discussed above) so that light beam 18 and FOVs 24 and 26 converge as illustrated in FIG. 2b. Alternatively, mirrors can be used to direct light beam 18 and FOVs 24 and 26 (at angles similar to angles G and F discussed above) to converge as seen in FIG. 2c.

Figure 5:
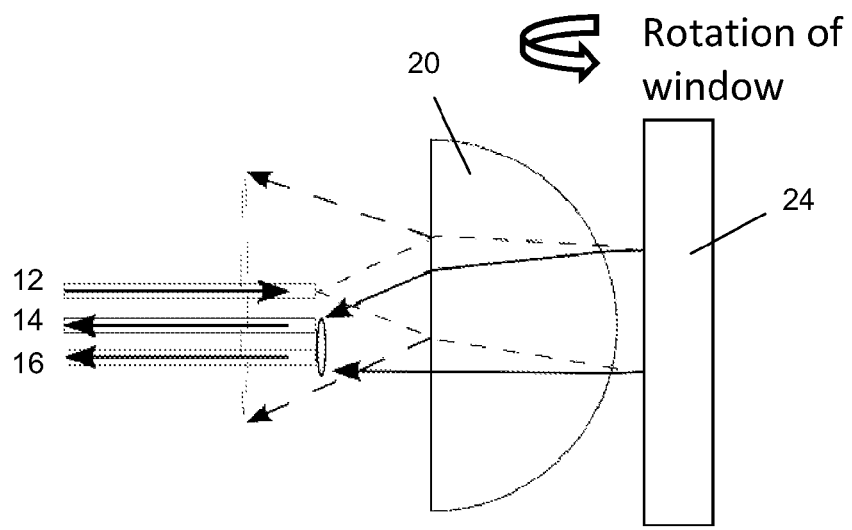
FIG. 5 illustrates the embodiment of FIG. 1 with the lens and window tilted or rotated to minimize the effects of reflections from these elements.
Figure 6:
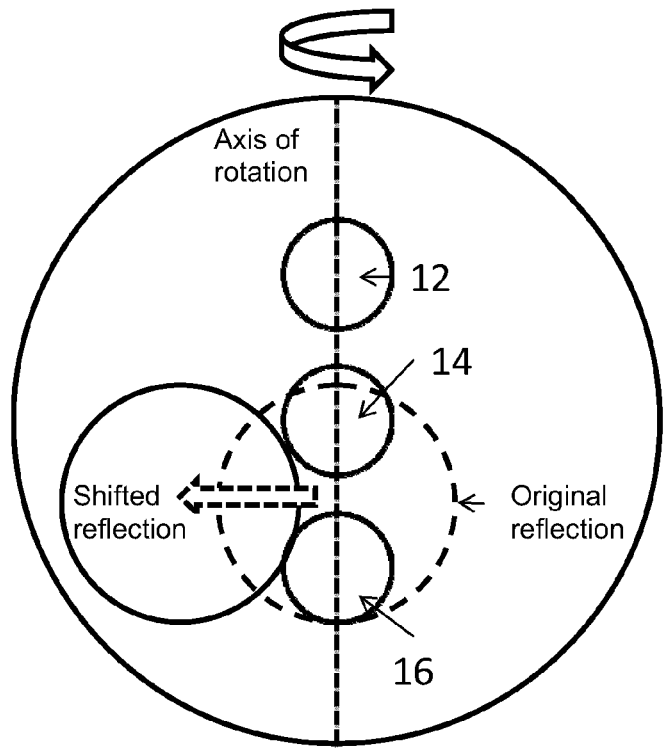
FIG. 6 is an illustration of the effects of tilted lens and/or windows from FIG. 5.

In accordance with another aspect of the present invention, the reflection of the launch light originating from light source 12 from window 24 and/or the front flat surface of lens 20 backward toward reference detector 14 and signal detector 16 can be minimized by angling window 24 and/or lens 20 relative to the axis of probe 10 or the axis of light beam 18. FIGS. 5 and 6 show the reflection from window 24 and/or lens 20 being deflected away from reference detector 14 and signal detector 16. The deflection may be partial as shown or may be complete. The light reflection discussed in this paragraph refers to the light reflected by lens 20 and/or window 24 before reaching gap L or blade 22.

In accordance with another aspect of the present invention, the optical power, i.e., the focusing strength or the focal length, of lens 20 can be decreased to make angles F and G more shallow or more acute. This stretches triangles 1-3-4 and 1-2-4 longer and increases the working range of sensor 10, but reduces the resolution of probe 10. Vice versa, the optical power of lens 20 can be increased, i.e., increasing its focusing strength to increase resolution but reduces the working range of sensor 10. This effect can also be produced by varying the distance from the ends of the fibers to the lens as shown in the Example below.

In another aspect of the present invention, light beam 18 can be converging, collimated, or diverging. Converging light beam 18 would generally focus the light resulting in stronger reflected light, but with a reduced working range. Conversely, diverging light beam 18 would generally dilute the light and extend the working range, but at the expense of reduced optical power.

Figure 7:
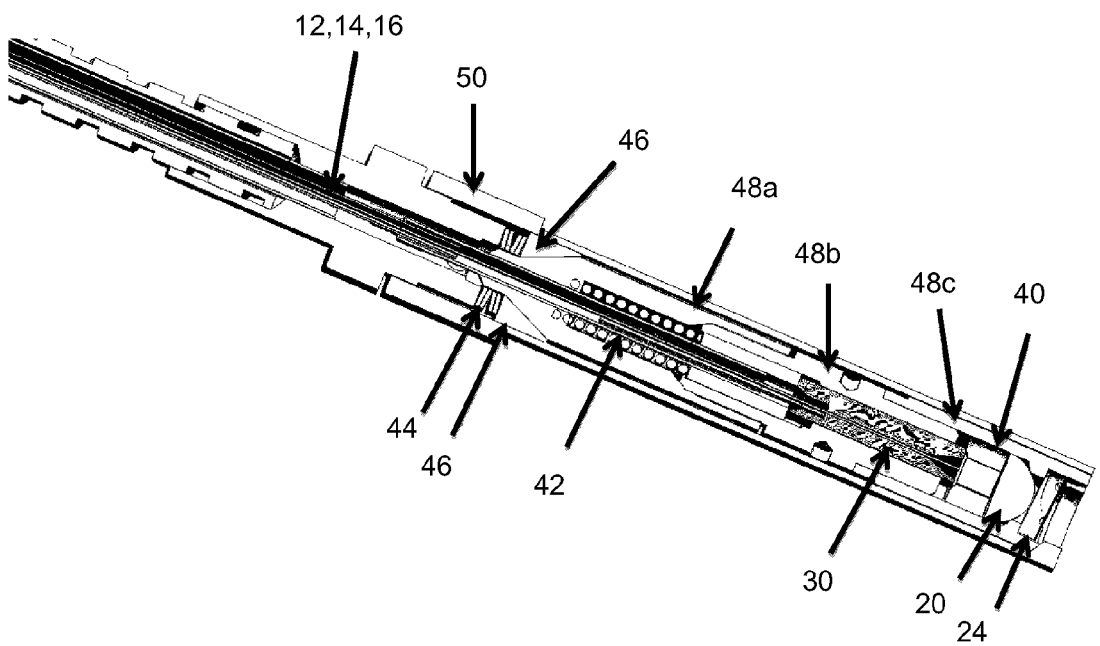
FIG. 7 is a cross-section of an exemplary fully assembled inventive probe.
Figure 8:
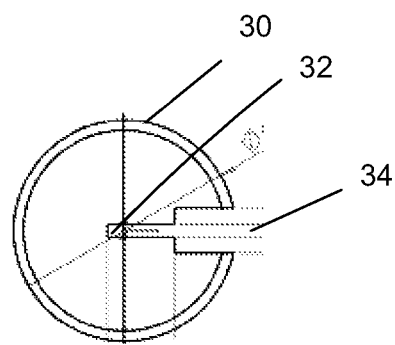
FIG. 8 is a cross-sectional view of a slotted ferrule.

A fully assembled, exemplary probe 10 is illustrated in FIG. 7. Light source 12 and detectors 14 and 16 are shown entering probe 10 on the left side of FIG. 7 and are received in slotted ferrule 30. Slotted ferrule 30 can be used to align and retain optical fibers 12, 14 and 16, which in this exemplary probe embody light source 12 and detectors 14 and 16. As illustrated in FIG. 8, slotted ferrule 30 has channel 32 to hold or retain the optical fiber and slotted opening 34 to allow the optical fiber to be installed into channel 32. Lens 20 and window 24 are positioned spaced apart from slotted ferrule 30. Spacer 40 is used to set a distance from the ends of fibers 12, 14 and 16 to lens 20. Spring 42 biases ferrule 30 toward the front of probe 10 to be in contact with spacer 40. Another spring 44 pushes wedges 46, which centers probe 10 within outer housing 50. Probe 10 further comprises spring holder 48a, which houses spring 42, ferrule holder 48b and lens holder 48c, which centers lens 20 and retains window 24. Elements 48a-48c can be made integral to each other.

Figure 9A:
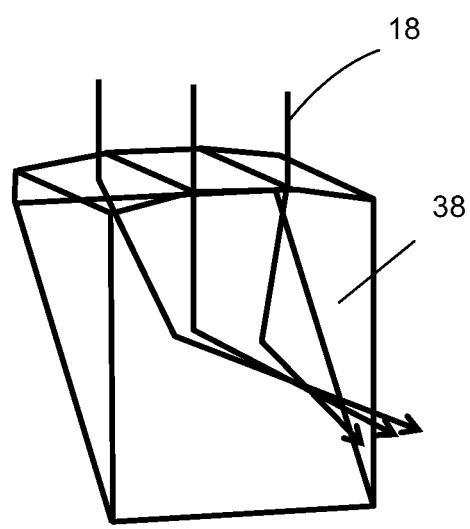
FIGS. 9A-9C show a prism that can steer or angle light.
Figure 9B:
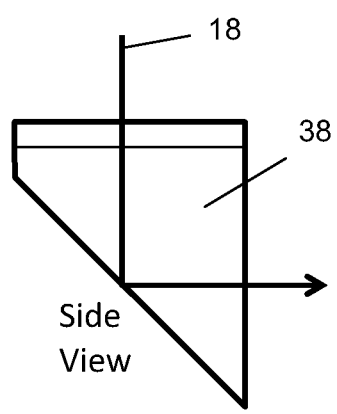
Figure 9C:
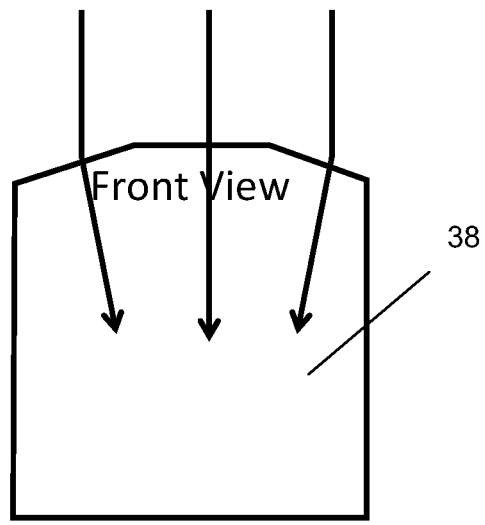

A mirror, a refractive optical element, such as prism 38 illustrated in FIGS. 9A-9C, or a diffractive optical element can angularly steer or redirect light beam 18 and FOVs 26 and 28 at any angle, including a right angle, so that probe 10 can be used at any angle. Prism 38 can replace window 24 or be used in conjunction with window 24.

The term "lens" used in connection with lens 20 can be any object that bends light and FOVs as described herein. This term includes angled windows or windows with several angular surfaces. Furthermore, optical fibers 12, 14 and 16, which function as light source 12 and reference detector 14 and signal detector 16, do not have to be discrete fibers. These optical fibers may be co-axial fibers or multi-core fibers, as shown in FIGS. 10-12.

In another aspect of the present invention, more than three optical fibers can be used. In one example, an additional co-planar light source can be added to extend the lighted area within the shroud of the stationary member. Alternatively, the additional light source may have a different frequency than light beam 18 so that reference detector 14 and signal detector 16 can receive two different set of reflected lights at different frequencies to arrive at two measurements of gap L. This redundancy allows the two gap L measurements to be compared to each other for repeatability and to improve accuracy.

Figure 10:
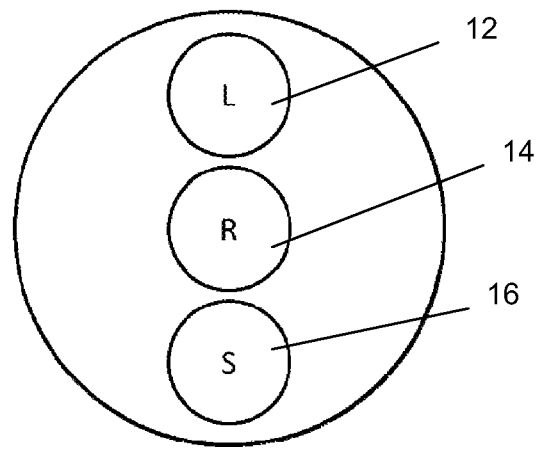
FIGS. 10-12 are exemplary end views of multi-core optical fibers suitable for the present invention.
Figure 11:
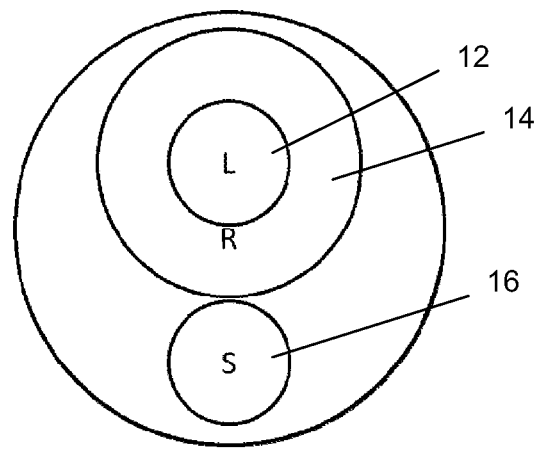
Figure 12:
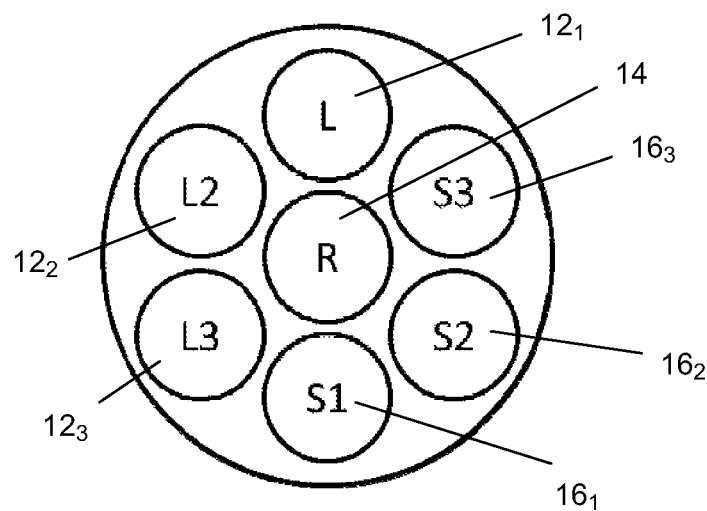

Additionally, multiple launch fibers and multiple detectors that are coplanar or non coplanar can be employed, as shown in FIGS. 10-12. These fibers can be discrete/single core fibers or multi-core fiber(s), as discussed above. FIG. 10 shows three coplanar optical fibers 12, 14 and 16 in a multi-core fiber. FIG. 11 shows optical cores 12 and 14 as coaxial cable and core 16 within a sheath. All three cores can be coaxial to each other and any combinations of two cores can be coaxial to each other. FIG. 12 shows a high core count fiber with a high number of channels. Any number of cores $12_1$, $12_2$ and $12_3$ can be used to launch light or radiation and any number of cores 14, $16_1$, $16_2$ and $16_3$ can be used as detectors, whether reference or signal detectors. As stated above, the term "reference" and "signal" do not describe any specific property of the detector. The embodiment of FIG. 12 has an advantage of being less sensitive to the orientation of probe 10 relative to the rotating members or blades 22. For example, probe 10 may function with optical fibers $12_1$, 14 and $16_1$, or $12_2$, 14 and $16_{12}$ or $12_3$, 14 and $16_3$.

The data processing methods for data coming from two channels described in commonly-owned patent applications US-2010-0177299 A1 and US-2010-0168981 A1 are also suitable for processing the data collected by detectors 14 and 16 of the present invention.

This probe geometry is also capable of identifying other features of the blade including but are not limited to driving the blade identification discussed in parent provisional application Ser. No. 61/520,953, as well as the damage detection capabilities, discussed in parent provisional application Ser. No. 61/520,948. These two parent applications are incorporated herein by reference in their entireties.

The size of probe 10 can be as small as ¼ inch in diameter. Hence, probes 10 can be installed in limited access areas around jet engines. A machine fixture suitable for manufacturing probes 10 for performing precision polishing of spacers to separate fibers 12, 14 and 16 from lens 20 is shown in priority provisional application Ser. No. 61/461,180.

EXAMPLE

Figure 13:
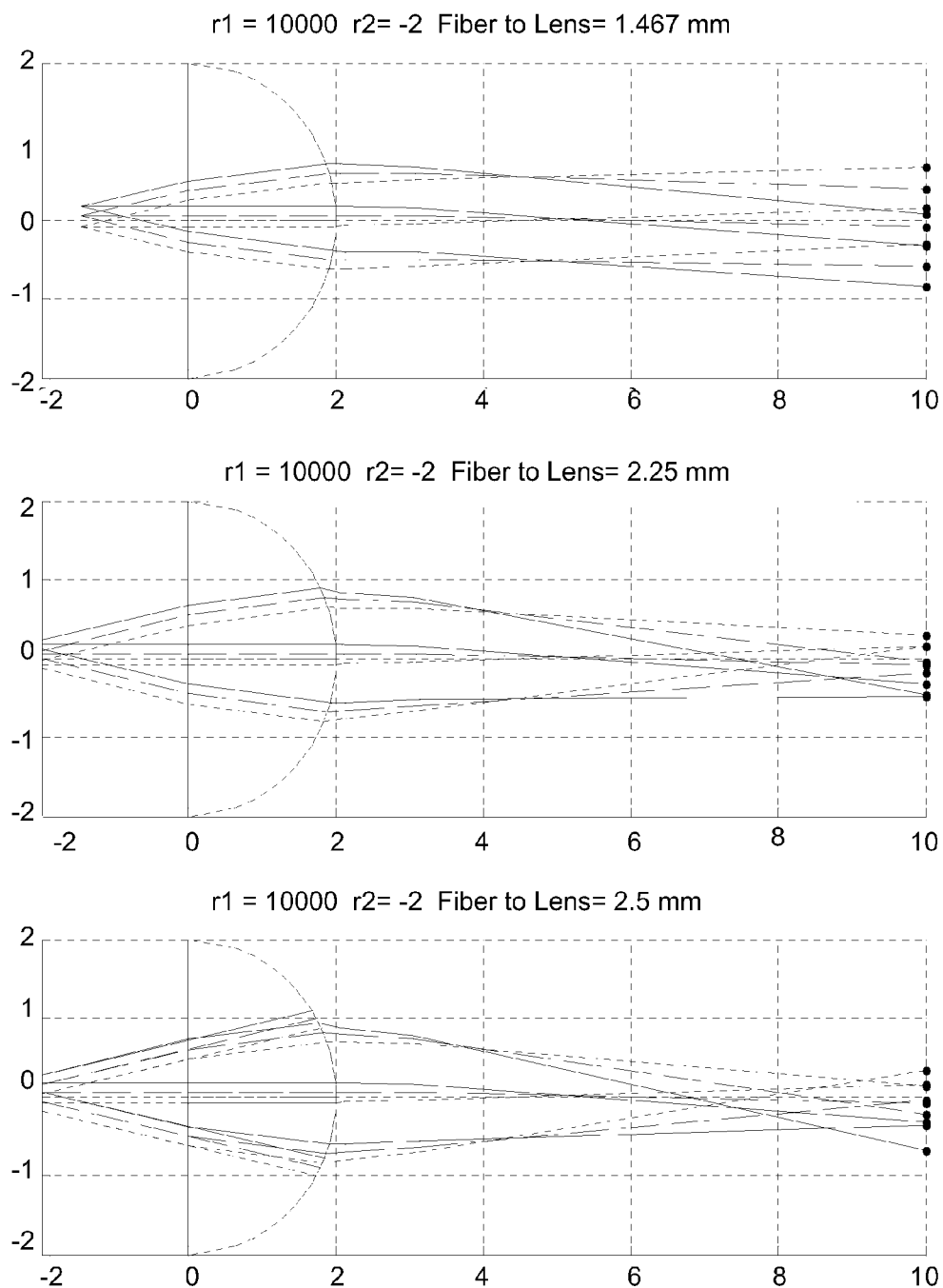
FIG. 13 are ray trace diagrams of the probe of the present invention.

An experiment was conducted to establish the relationship between the distance between the distal ends of optical fibers 12, 14 and 16 to lens 20 and the dynamic range of probe 10. The fiber to lens distances of about 1.467 mm, 2.25 mm and 2.50 mm were tested. FIG. 13 shows ray trace diagrams of the optical system for three different values of the fiber to lens distance (top=1.467 mm, middle=2.250 mm, bottom=2.500 mm). The horizontal axis of the ray trace diagrams shows distance in millimeters with the left side of lens 20 at 0 mm. The launch point of light beam 18 is off the chart for the middle and bottom diagrams.

In each of the plots, the solid lines correspond to the path of the launched light, while the dashed line represents the field of view for the reference channel, and the dotted line is the field of view of the signal channel. Although not shown, window 24 is also accounted for, with the exterior face being located at the location of 3.1 mm. The three ray trace diagrams show that the spot size of each beam comes to a tighter focus at the narrowest point for that beam. This occurs at the distance of about 9 mm in the middle plot and at the distance of about 8 mm is the bottom plot. Also, the distance at which the beams separate comes closer to the probe's optics. This defines the dynamic range of the probe—indicating the greatest distance which the target can be from the probe and still be sensed. At larger distances the target cannot be illuminated and within the receive channel's field of view at the same time, and hence will not return any light to detectors 14 or 16. The efficiency of light capture scales inversely with spot size, and proportionally to the degree of overlap between light beam 18 and FOVs 26 and 28 at the location of the blade. Therefore, the selection of an optimal or preferred value constitutes a balancing of the smaller spot size with the decreased dynamic range. For example, experimental data has shown that selection of the 2.25 mm spacing (as shown in the middle plot) results in a peak capture efficiency which is 185% of the efficiency which is obtained with the 1.467 mm spacing. The maximum operable distance (at which there ceased to be a received response) was, at the same time, reduced by approximately 2 mm.

While it is apparent that the illustrative embodiments of the invention disclosed herein fulfill the objectives stated above, it is appreciated that numerous modifications and other embodiments may be devised by those skilled in the art. Features of any embodiment can be used with any other embodiments. Therefore, it will be understood that the appended claims are intended to cover all such modifications and embodiments, which would come within the spirit and scope of the present invention.

What is claimed is:

1. A sensor comprising:
   a source of electromagnetic radiation to be mounted on a stationary member to project an electromagnetic radiation beam across a gap toward at least one translating member;
   a reference detector having a reference field of view (FOV) and a signal detector having a signal FOV to be mounted on the stationary member,
   wherein the electromagnetic radiation beam, the reference FOV and the signal FOV intersect in a volume including said gap,
   wherein a feature of the translating member is measured from the reflected electromagnetic radiation received by the reference detector and by the signal detector.

2. The sensor of claim 1, wherein said feature comprises the gap between the translating member and the stationary member.

3. The sensor of claim 2, wherein the gap is proportional to intervals between time markers on pulses produced by the reflected electromagnetic radiation received by the reference detector and the signal detector, or ratios of said intervals.

4. The sensor of claim 1, wherein said feature comprises a time period at which said translating member passes said volume.

5. The sensor of claim 1, wherein said feature comprises a profile of the intensity of the electromagnetic radiation reflected by the passing of said translating member through said volume.

6. The sensor of claim 1 further comprising an optical element to direct the electromagnetic radiation beam across said gap and to direct reflected electromagnetic radiation toward the reference detector and signal detector.

7. The sensor of claim 6, wherein the optical element comprises a lens, a window with at least one angle surface, a mirror or a prism.

8. The sensor of claim 6, wherein the optical element comprises a lens and a spacer is disposed between the lens and an end of the source of electromagnetic radiation.

9. The sensor of claim 1, wherein said stationary member comprises a window that is transparent to the electromagnetic radiation.

10. The sensor of claim 1, wherein the source of electromagnetic radiation, the reference detector and the signal detector each comprises an optical fiber or waveguide.

11. The sensor of claim 10, wherein at least one of the optical fibers or waveguides comprises an angled end.

12. The sensor of claim 10, wherein at least one of the optical fibers or waveguides is retained in a slotted ferrule.

13. A method for measuring a gap between a stationary member and at least one translating member comprising the steps of:
   i. projecting a beam of electromagnetic radiation across said gap;
   ii. providing a reference field of view (FOV) and a signal FOV across said gap;
   wherein the beam of electromagnetic radiation, the reference FOV and the signal FOV intersect in a volume that includes said gap;
   iii. receiving reflected electromagnetic radiation through the reference FOV and the signal FOV as the translating member moves through the beam of electromagnetic radiation;
   iv. calculating said gap from time markers on pulses derived from at least one of a signal pulse received from the signal FOV and a reference pulse received from the reference FOV.

14. The method of claim 13, wherein the time markers comprises at least one time marker from the signal pulse and at least one corresponding time marker on the reference pulse.

15. The method of claim 14, wherein step (iv) comprises a step of determining a ratio between a rise time in the signal pulse and a rise time in the reference pulse.

16. The method of claim 14, wherein step (iv) comprises a step of determining a ratio between a fall time in the signal pulse and a fall time in the reference pulse.

17. The method of claim 14, wherein step (iv) comprises a step of determining a ratio between a delay time in the signal pulse and a delay time in the reference pulse.

18. The method of claim 13, wherein the time markers comprises at least one time marker from the signal pulse and at least one dissimilar time marker on the reference pulse.

19. The method of claim 18, wherein step (iv) comprises a step of determining a ratio between signal rise time and rise time delay.

20. The method of claim 13 further comprising the step of providing an optical element to direct the electromagnetic radiation beam across said gap and to direct reflected electromagnetic radiation toward the reference detector and the signal detector.

21. The method of claim 20 further comprising the step of minimizing a reflection of said electromagnetic radiation from said optical element back to the reference detector and the signal detector.

22. The method of claim 20, further comprising the step of varying the optical power of the optical element by varying the distance from the end of the electromagnetic radiation beam and the FOVs to the optical element.

* * * * *

UNITED STATES PATENT AND TRADEMARK OFFICE
CERTIFICATE OF CORRECTION

| | | |
|---|---|---|
| PATENT NO. | : 8,553,237 B2 | |
| APPLICATION NO. | : 13/347299 | |
| DATED | : October 8, 2013 | |
| INVENTOR(S) | : Daniel Kominsky et al. | |

It is certified that error appears in the above-identified patent and that said Letters Patent is hereby corrected as shown below:

On the title page, in item (75), insert --Malcolm Laing, Blacksburg VA (US)-- under Daniel Kominsky to reflect the corrected full inventorship.

Signed and Sealed this
Twenty-third Day of June, 2015

Michelle K. Lee
*Director of the United States Patent and Trademark Office*